(12) United States Patent
Williams

(10) Patent No.: US 8,290,368 B2
(45) Date of Patent: Oct. 16, 2012

(54) DETECTING COLLISIONS ON MULTIPOINT SHARED OPTICAL MEDIA

(75) Inventor: Timothy J Williams, Raleigh, NC (US)

(73) Assignee: Alcatel Lucent, Paris (FR)

( * ) Notice: Subject to any disclaimer, the term of this patent is extended or adjusted under 35 U.S.C. 154(b) by 607 days.

(21) Appl. No.: 12/500,117

(22) Filed: Jul. 9, 2009

(65) Prior Publication Data

US 2011/0008045 A1  Jan. 13, 2011

(51) Int. Cl.
*H04B 10/20* (2006.01)
*H04J 14/00* (2006.01)

(52) U.S. Cl. ............................................ 398/58; 398/66

(58) Field of Classification Search .................... 398/58, 398/66, 36, 156, 159
See application file for complete search history.

(56) References Cited

U.S. PATENT DOCUMENTS

| 4,580,872 | A | * | 4/1986 | Bhatt et al. | 398/99 |
| 4,646,361 | A | * | 2/1987 | Usui | 398/62 |
| 4,713,841 | A | * | 12/1987 | Porter et al. | 398/191 |
| 4,781,427 | A | * | 11/1988 | Husbands et al. | 385/24 |
| 5,012,467 | A | * | 4/1991 | Crane | 370/445 |
| 5,390,039 | A | * | 2/1995 | Yamamoto et al. | 398/99 |
| 7,242,739 | B2 | * | 7/2007 | Boles et al. | 375/375 |
| 2004/0042235 | A1 | * | 3/2004 | Fukuoka | 363/8 |
| 2004/0252801 | A1 | * | 12/2004 | Boles et al. | 375/355 |
| 2009/0202242 | A1 | * | 8/2009 | Niibe et al. | 398/63 |

* cited by examiner

*Primary Examiner* — Kenneth N Vanderpuye
*Assistant Examiner* — Abbas H Alagheband
(74) *Attorney, Agent, or Firm* — RG & Associates

(57) ABSTRACT

A system, and methods for detecting collisions on multipoint shared optical media, comprising an optical receiver, clock phase detector, clock recovery circuit, and a Passive Optical Network (PON) that transmits optical signals wherein the PON, the clock recovery circuit, and the clock phase detector are communicably coupled to the optical receiver, detecting of the collision is determined by a distortion of transition times of the optical signals at the optical receiver.

16 Claims, 6 Drawing Sheets

DETECTING COLLISIONS ON MULTIPOINT SHARED OPTICAL MEDIA

FIELD OF THE INVENTION

The present disclosure is generally related to Passive Optical Networks (PONs) and more particularly to successfully detecting collisions from Optical Network Terminal (ONT) unit transmissions.

BACKGROUND OF THE INVENTION

A passive optical network (PON) is a system that brings optical fiber cabling and signals all or most of the way to the end user. The passive simply describes the fact that optical transmission has no power requirements or active electronic parts once the signal is going through the network.

A traditional PON consists of an Optical Line Termination (OLT) at the communication company's office and a number of Optical Network Units (ONUs) near end users. An ONU is a form of Access Node that converts optical signals transmitted via fiber to electrical signals that can be transmitted via coaxial cable or twisted pair copper wiring to individual subscribers.

The OLT services a number of ONUs typically connected in a star arrangement using optical splitters, which typically reside at a premise of a user. Multiple ONT units share a single upstream wavelength to communicate with the OLT at the head end. Each ONT unit assigns a specific time slot in which to communicate. This is an optical multipoint-to-point bus that is subject to corruption if an ONT unit transmits at any time other than during its assigned time slot. When this occurs, the output collides optically with each other causing a collision.

Traditional methods to detect collisions on multipoint, shared optical media require deducing an insubordinate ONT unit is present from error indications on the PON. These error indications are the same ones used to monitor the general function of an ONT unit. There is insufficient resolution in these error indications to identify this type of error. For example, it is possible that a loss of burst is caused by cyclic redundancy check (CRC) mismatch, bit interleaved parity (BIP) error, or header corruption. Although an insubordinate ONT unit could cause these indications, other impairments or functional issues can also cause them. General responses to an ONT unit exhibiting these behaviors are to disable the ONT unit in question. If the failure is caused by an insubordinate ONT unit, the wrong unit may have been disabled.

Current collision solutions depend on inference of the collisions at a higher logical layer from the lost of burst, error rates, or other indirect means. The solutions do not provide conclusive deductions of the existence of the collisions because other types of failures or degradation can generate the problem. Failure signature of a collision at the media access control (MAC) layer suggests an ONT unit that is faulty, with the possible result that the affected (disturbed) unit is disabled. Consequences of this action are complete loss of service to the associated customer. Therefore, a more reliable means of detection is desired to prevent the disabling of a functioning ONT unit, and facilitate detection of a faulty ONT unit.

SUMMARY OF THE INVENTION

The present disclosure relies on the fact that while the ONT units on an optical network derive their timing from the downstream optical signal, variability exists between the ONT units due to their locations on the PON. This variability will result in distortions of transition times at the optical receiver if more than one ONT unit is transmitting at once. This is discovered by detecting duty cycle distortion and/or excess jitter on the OLT optical receiver output.

Other mechanisms to detect collisions are available including direct measurement, phase detector output analysis, or variations of clock/sampled data slicing techniques.

In one embodiment of the disclosure, a system for detecting collisions on multipoint shared optical media, comprises an optical receiver, clock phase detector, clock recovery circuit, and a Passive Optical Network (PON) that transmits optical signals wherein the PON, the clock recovery circuit, and the clock phase detector are communicably coupled to the optical receiver. The detection of the collision is determined by a distortion of transition times of the optical signals at the optical receiver.

In another embodiment of the disclosure, a method for detecting a collision on multipoint shared optical media, comprises transmitting, by a plurality of Optical Network Terminal (ONT) units at different locations, optical signals, determining a timing variability between the ONT units due to the different locations wherein the variability will result in a distortion of transition times of the optical signals at an optical receiver if the ONT units are transmitting the optical signals simultaneously, and detecting the collision by determining the distortion of the transmission times.

In a further embodiment of the disclosure, a method for detecting a collision on multipoint, shared optical media, comprises detecting the collision when a clock recovery circuit detects distortion of transition times of optical signals.

DETAILED DESCRIPTION OF THE INVENTION

Figure 1:
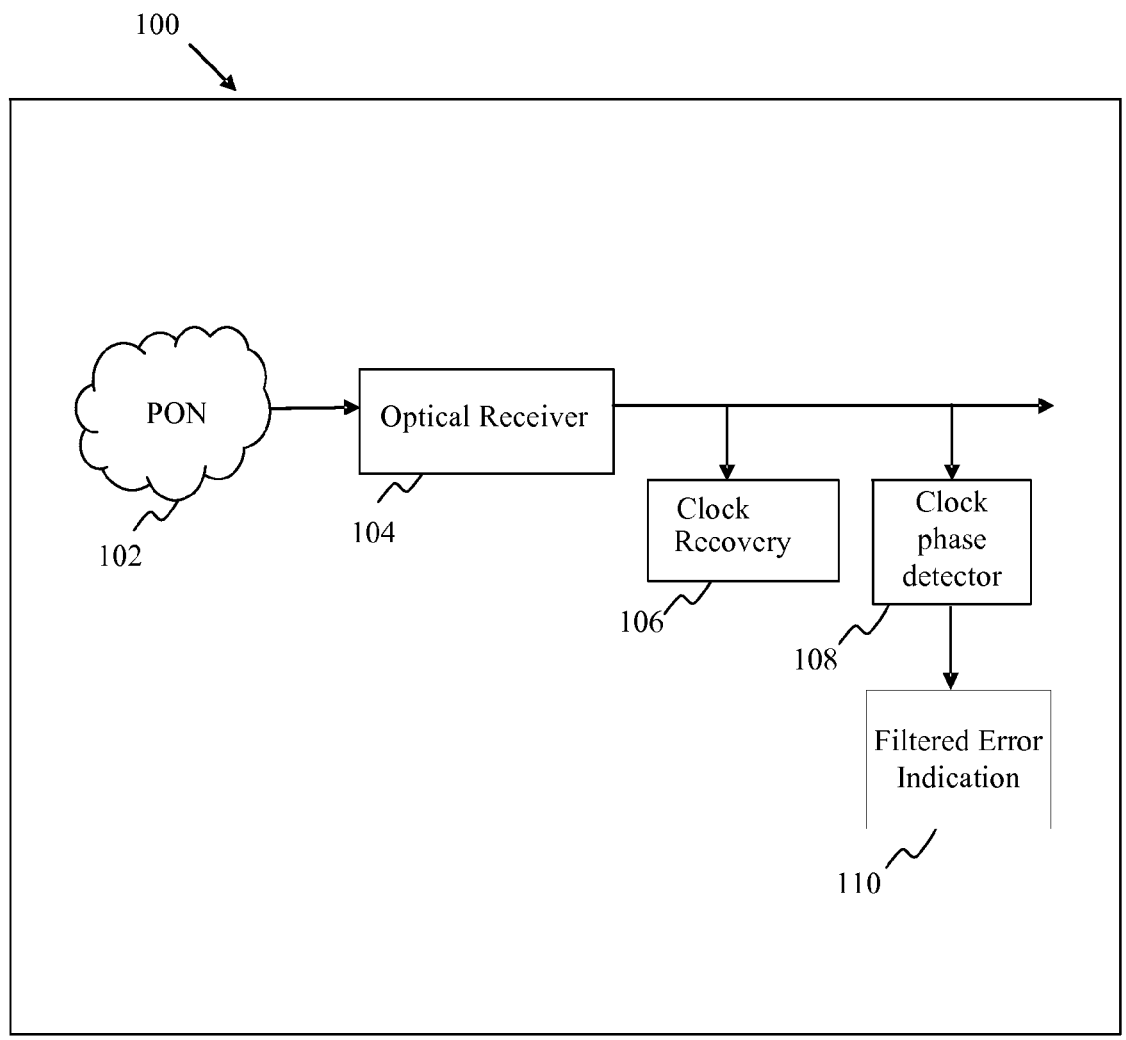
FIG. 1 represents a block diagram depicting a clock recovery circuit and phase detector in accordance with an embodiment of the disclosure.

Now referring to FIG. 1, a block diagram 100 depicting a clock recovery circuit and clock phase detector is depicted. A PON 102 sends out an optical signal that is processed by an Optical Receiver 104. A clock recovery circuit 106, based on clock phase alignment techniques, is used to detect distortion of the received signal. Clock phase detectors 108 operate by detecting edge transitions on the incoming data, and tuned to expect transitions at the existing data rate. The output of the clock phase detector is the filtered error indication 110. Modification to allow detection of the anomalous transitions caused by the optical collisions requires only that the clock phase detectors used be monitored for out of phase transitions. Such transitions are filtered and stored to trigger an alarm.

Figure 2:
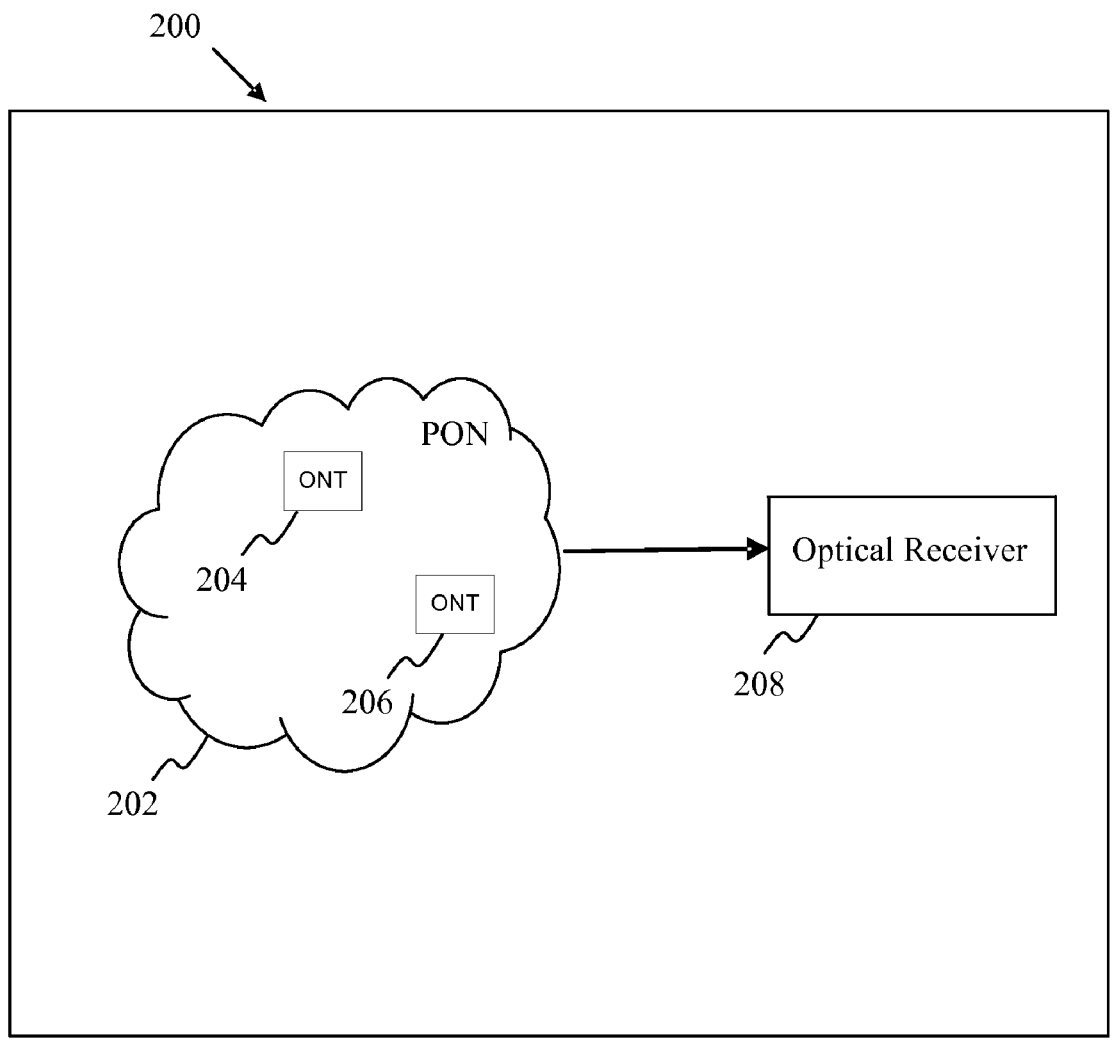
FIG. 2 illustrates a block diagram depicting a PON comprising two ONT units and an Optical Receiver.

Referring now to FIG. 2, a block diagram 200 depicts a PON 202, containing, for example, two ONT units 204 and 206. An Optical Receiver 208 receives optical signals from the ONT units 204 and 206. While ONT units 204 and 206 derive their timing from the downstream optical signal, there is variability between the ONT units 204 and 206 due to their different locations on the PON 202. This variability will result in distortions of transition times at the optical receiver 208 when the ONT units 204 and 206 are transmitting simultaneously.

Figure 3:
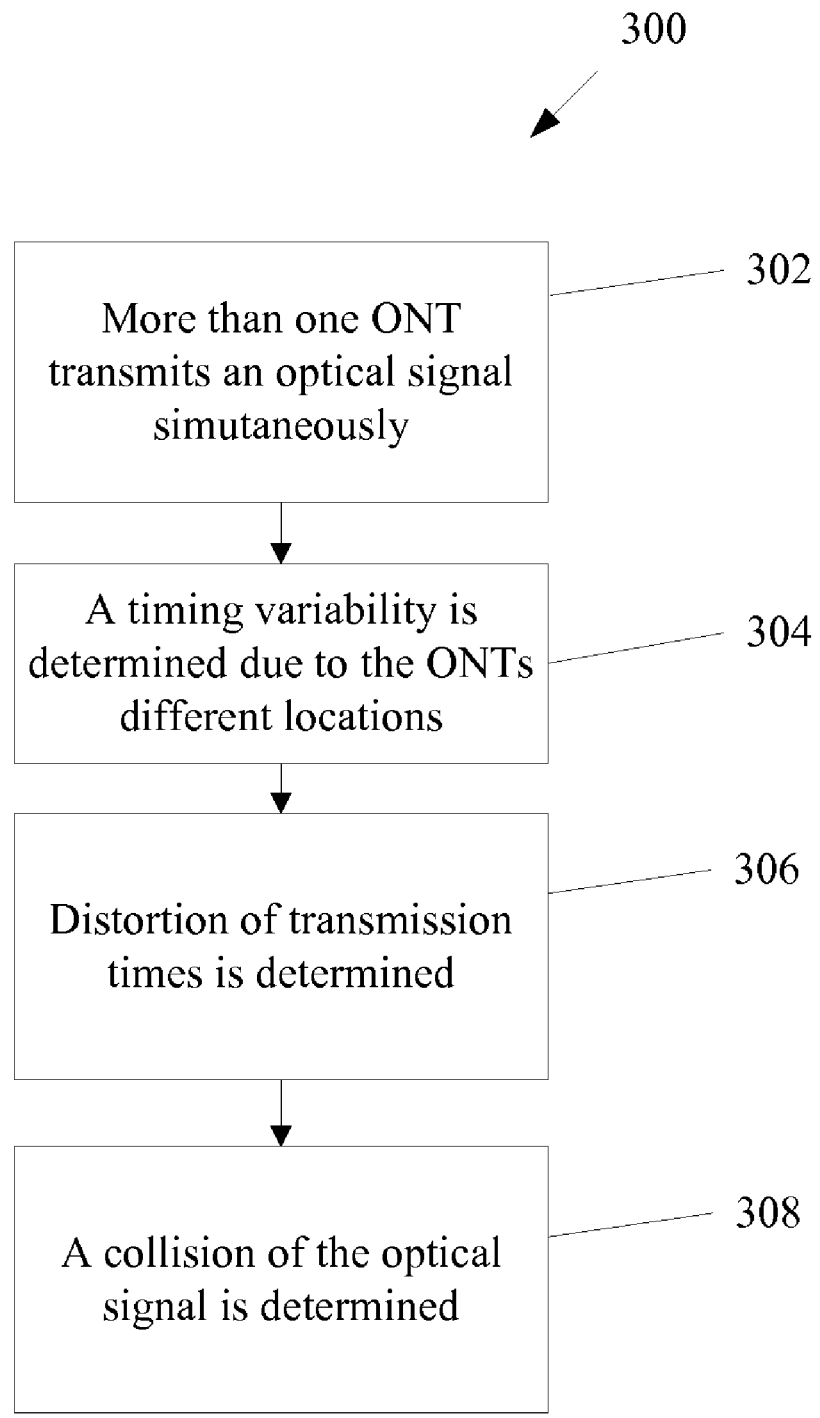
FIG. 3 represents a flow chart of methods for detecting collisions on multipoint, shared optical media in accordance with an embodiment of the disclosure.

Referring now to FIG. 3, a flowchart 300 depicts the detection of optical signal collisions on a multipoint, shared optical media. The flowchart 300 begins at step 302, when more than one ONT unit, located at different locations in the PON, transmits an optical signal simultaneously. The output of the optical receiver is monitored and compared to an expected transition interval of 800 ps, for example, when only one ONT unit is transmitting. When edge transitions that do not conform to the expected transition interval are received, a timing variability in the received optical signal is detected due to the ONT units different locations in the PON, step 304. In step 306, the timing variability results in a distortion of the transmission times of the received optical signals indicating the presence of another transmitting ONT unit. Finally, in step 308, the collision of the optical signals is determined based on the distortion of transmission times.

Figure 4:
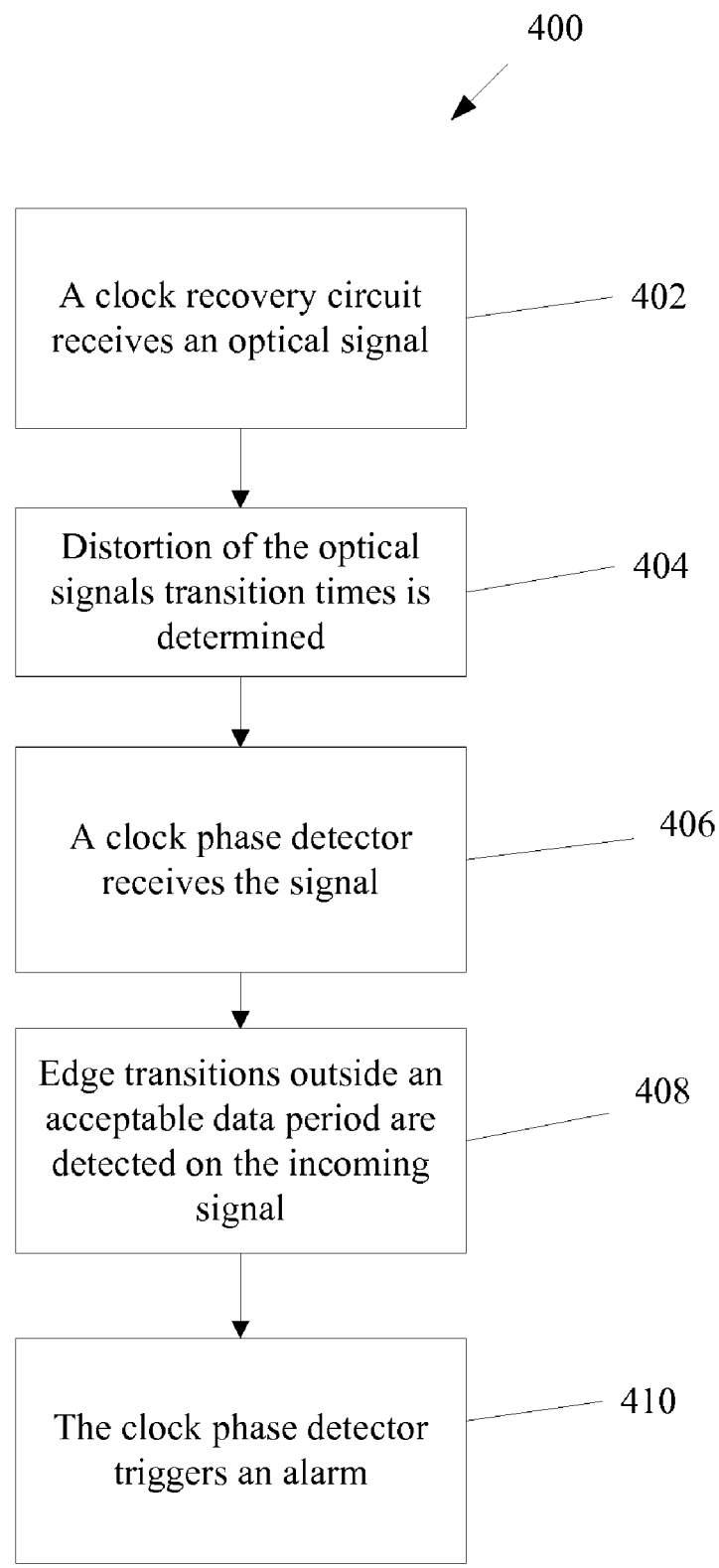
FIG. 4 represents a further flowchart of methods for detecting collisions on multipoint, shared optical media in accordance with an embodiment of the disclosure.

Referring now to FIG. 4, a flowchart 400 depicts the detection of optical signal collisions on a multipoint, shared optical media. The flowchart 400 begins at step 402, when a clock recovery circuit receives an optical signal. In step 404, the clock recovery circuit detects distortion of transition times of the optical signal. In step 406, the optical signal is received in the clock phase detector. In step 408, edge transitions are detected outside an expected data period. Finally, in step 410, an alarm is triggered by the clock phase detector based on the edge transitions occurring outside the acceptable data period.

Figure 5:
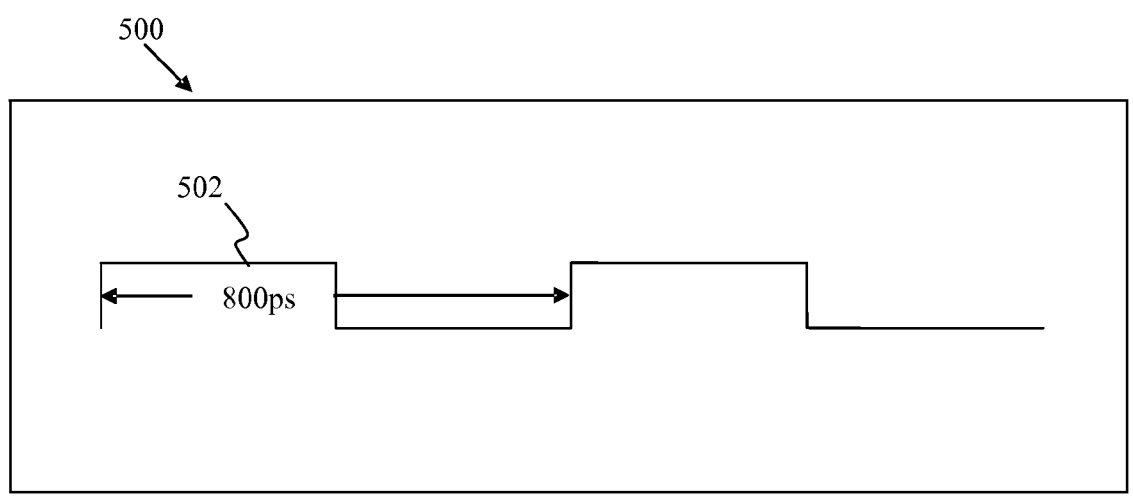
FIG. 5 represents an upstream optical signal at a Gigabit PON (GPON) rate (1010 pattern) in accordance with an embodiment of the disclosure.

Referring now to FIG. 5, an upstream optical signal 500 at a GPON rate (1010 pattern) is depicted. Given a nominal upstream optical signal at the GPON rate 502, the nominal period is around 803 ps NRZ, with a nominal (and approximately) 50% duty cycle. Delay due to flight time in the fiber is around 5 ns/m or around 5000 ps/m. The upstream data is frequency locked to the downstream OLT unit data transmitted on a separate wavelength. When observed, the receiving OLT unit will see a distribution of arriving phase of the upstream signal between each of the ONT units. In other embodiments, the GPON rate, nominal period, duty cycle and/or delay due to flight time may be altered without departing from the scope of the present invention.

Figure 6:
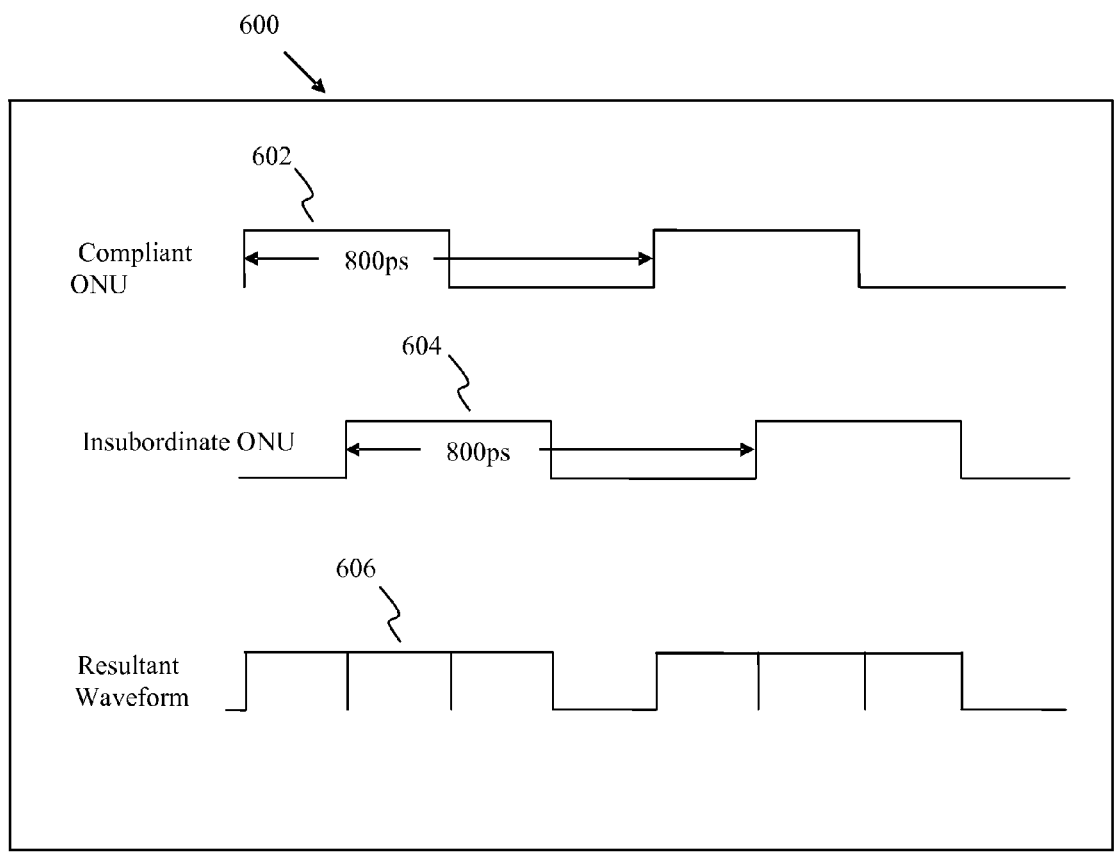
FIG. 6 illustrates three waveforms to show a resultant waveform when an edge transition is occurring in accordance with an embodiment of the disclosure.

Now referring to FIG. 6, three waveforms 600 showing a resultant waveform 606 when an edge transition is occurring is depicted. This resultant waveform is due to the combining of the compliant waveform 602, and insubordinate waveform 604. If an insubordinate ONT unit's waveform 604 is transmitting out of turn such that its output is on when another ONT unit is transmitting, the result will be a distortion of the received signal 606. Further, the output of the optical receiver on the OLT in the electrical domain will reveal edge transitions that do not conform to the nominal 800 ps data period expected when only one ONT unit is transmitting. These edge transitions can be monitored and compared to the expected transition interval. Edge transitions occurring outside of the expected interval will indicate the presence of another transmitting ONT unit, revealing the presence of an insubordinate unit.

Other mechanisms to detect collisions are available including direct measurement, phase detector output analysis, or variations of clock/sampled data slicing techniques and can be employed without departing from the scope of the present invention.

In one embodiment of the disclosure, a system for detecting collisions on multipoint shared optical media, comprises an optical receiver, clock phase detector, clock recovery circuit, and a Passive Optical Network (PON) that transmits optical signals. The PON, the clock recovery circuit, and the clock phase detector are communicably coupled to the optical receiver. Detection of the collision is determined by a distortion of transition times of the optical signals at the optical receiver, wherein the PON comprises a plurality of Optical Network Terminal (ONT) units, wherein the ONT units transmit the optical signals, and wherein a timing variability between the ONT units occurs due to their differing locations on the PON. The variability will result in the distortion of transition times of the optical signals at the optical receiver if the ONT units are transmitting the optical signals simultaneously.

An output of the optical receiver reveals edge transitions that do not conform to a nominal data period expected when only one ONT unit is transmitting, wherein the nominal data period is around 800 ps, and wherein the edge transitions are monitored and compared to an expected transition interval. The edge transitions occurring outside of the expected transition interval indicate a presence of another transmitting ONT unit, wherein the presence of another transmitting ONT unit reveals a presence of an insubordinate ONT unit. The clock recovery circuit, utilizing clock phase alignment techniques, detects distortion of transition times of the optical signals. The clock phase detector detects the edge transitions and expects the edge transitions at the data period, wherein if the edge transitions are not at the data period, the clock phase detector filters the edge transitions, wherein the clock phase detector stores the filtered edge transitions, and wherein the clock phase detector triggers an alarm.

In another embodiment of the disclosure, a method for detecting a collision on multipoint shared optical media, comprises transmitting, by a plurality of Optical Network Terminal (ONT) units at different locations, optical signals, and determining a timing variability between the ONT units due to the different locations. The variability will result in a distortion of transition times of the optical signals at an optical receiver if the ONT units are transmitting the optical signals simultaneously. The method further comprises detecting the collision by determining the distortion of the transmission times, wherein an output of the optical receiver reveals edge transitions that do not conform to a nominal 800 ps data period expected when only one ONT unit is transmitting. The edge transitions are monitored and compared to an expected transition interval, and the edge transitions are occurring outside of the expected transition interval indicate a presence of another transmitting ONT unit. The presence of another transmitting ONT unit reveals a presence of an insubordinate ONT unit.

In a further embodiment of the disclosure, a method for detecting a collision on multipoint shared optical media, comprises detecting the collision when a clock recovery circuit detects distortion of transition times of optical signals, detecting, by a clock phase detector, edge transitions. The clock phase detector is communicably coupled to the clock recovery circuit. The method further comprises expecting the edge transitions at a data period. If the edge transitions are not at the data period, the method comprises triggering an alarm by the clock phase detector.

Systems, methods, devices and computer readable media have been shown and/or described in the above embodiments for detecting collisions on multipoint, shared optical media. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

What is claimed is:

1. A system for detecting a collision on multipoint shared optical media, comprising:
    an optical receiver;
    a clock phase detector;
    a clock recovery circuit; and
    a Passive Optical Network (PON) that transmits optical signals;
    wherein the PON, the clock recovery circuit and the clock phase detector are communicably coupled to the optical receiver;
    wherein the detection of the collision is determined by a distortion of transition times of the optical signals at the optical receiver;
    wherein the clock phase detector detects edge transitions of the optical signals and expects the edge transitions to conform to a nominal data period;
    wherein if the edge transitions are not at the nominal data period, the clock phase detector filters the edge transitions; and
    wherein the clock phase detector stores the filtered edge transitions.

2. The system of claim 1, wherein the PON comprises a plurality of Optical Network Terminal (ONT) unit.

3. The system of claim 2, wherein the ONT units transmit the optical signals.

4. The system of claim 3, wherein a timing variability between the ONT units occurs due to their differing locations on the PON.

5. The system of claim 4, wherein the variability will result in the distortion of transition times of the optical signals at the optical receiver if the ONT units are transmitting the optical signals simultaneously.

6. The system of claim 1, wherein an output of the optical receiver reveals edge transitions that do not conform to the nominal data period expected when only one ONT unit is transmitting.

7. The system of claim 6, wherein the nominal data period is around 800 ps.

8. The system of claim 6, wherein the edge transitions are monitored and compared to an expected transition interval.

9. The system of claim 8, wherein the edge transitions occurring outside of the expected transition interval indicate a presence of another transmitting ONT unit.

10. The system of claim 9, wherein the presence of another transmitting ONT unit reveals a presence of an insubordinate ONT unit.

11. The system of claim 1, wherein the clock recovery circuit utilizing clock phase alignment techniques detects distortion of transition times of the optical signals.

12. The system of claim 1, wherein the clock phase detector triggers an alarm.

13. A method for detecting a collision on multipoint shared optical media, comprising:
    transmitting, by a plurality of Optical Network Terminal (ONT) units at different locations, optical signals;
    determining a timing variability between the ONT units due to the different locations;
    wherein the variability will result in a distortion of transition times of the optical signals at an optical receiver if the ONT units are transmitting the optical signals simultaneously; detecting the collision by determining the distortion of the transmission times;
    detecting, by a clock phase detector, edge transitions of the optical signals and expecting the edge transitions to conform to a nominal data period;
    if the edge transitions are not at the nominal data period, filtering, by the clock phase detector, the edge transitions; and
    storing, by the clock phase detector, the filtered edge transitions.

14. The method of claim 13, wherein an output of the optical receiver reveals edge transitions that do not conform to a nominal 800 ps data period expected when only one ONT unit is transmitting.

15. The method of claim 14, wherein the edge transitions:
    are monitored and compared to an expected transition interval;
    occurring outside of the expected transition interval indicate a presence of another transmitting ONT unit; and
    wherein the presence of another transmitting ONT unit reveals a presence of an insubordinate ONT unit.

16. A method for detecting a collision on multipoint shared optical media, comprising:
    detecting the collision when a clock recovery circuit detects distortion of transition times of optical signals;
    detecting, by a clock phase detector, edge transitions of the optical signals and expecting the edge transitions to conform to a nominal data period;
    if the edge transitions are not at the nominal data period, filtering, by the clock phase detector, the edge transitions; and
    storing, by the clock phase detector, the filtered edge transitions;
    if the edge transitions are not at the nominal data period, triggering an alarm by the clock phase detector.

* * * * *